United States Patent [19]

Davis et al.

[11] Patent Number: 5,070,727
[45] Date of Patent: Dec. 10, 1991

[54] CRANKSHAFT ANGULAR POSITION DETECTING APPARATUS

[75] Inventors: Michael A. Davis, Goleta, Calif.; Philip A. Karau, Grand Blanc, Mich.

[73] Assignee: General Motors Corporation, Detroit, Mich.

[21] Appl. No.: 614,828

[22] Filed: Nov. 16, 1990

[51] Int. Cl.[5] ........................................... G01M 15/00
[52] U.S. Cl. ..................................................... 73/116
[58] Field of Search ............................. 73/116, 117.3; 250/231.18

[56] References Cited

U.S. PATENT DOCUMENTS

| | | | |
|---|---|---|---|
| 4,145,608 | 3/1979 | Shirasaki et al. | 250/231.14 |
| 4,181,884 | 1/1980 | Shirasaki et al. | 123/416 |
| 4,262,526 | 4/1981 | Makita et al. | 73/116 |
| 4,471,653 | 9/1984 | Kawamura et al. | 73/116 |
| 4,697,125 | 9/1987 | Goff et al. | 318/138 |
| 4,988,865 | 1/1991 | Schmidt et al. | 250/231.18 |

Primary Examiner—Robert Raevis
Attorney, Agent, or Firm—Creighton R. Meland

[57] ABSTRACT

A crankshaft angular position detecting apparatus for detecting the angular position of the crankshaft of an internal combustion engine. The crankshaft drives a timing wheel which has a plurality of circumferentially spaced slots located along its outer periphery. Two angularly spaced sensors are located adjacent the slots. The sensors develop voltage pulses as the slits move past the sensors. Two phase-displaced pulse trains are developed, one by each sensor, as the wheel rotates. The pattern of slots and the angular spacing of the sensors is such that a varying number of pulses of one pulse train occurs between consecutively occurring pulses of the other pulse train. The varying number of pulses provide different patterns and each pattern is indicative of a crankshaft position. The timing wheel is secured to the engine crankshaft and is located inside of the engine.

11 Claims, 3 Drawing Sheets

CRANKSHAFT ANGULAR POSITION DETECTING APPARATUS

This invention relates to an engine crankshaft angular position detecting apparatus and more particularly to a crankshaft position detecting apparatus for controlling a distributorless internal combustion engine ignition system.

An internal combustion engine distributorless ignition system requires a means for selecting the proper ignition coil for energization in synchronization with engine crankshaft position. One way of accomplishing this is disclosed in the U.S. Pat. No. 4,265,211 to Meloeny. In that patent a synchronizing pulse is developed at a certain crankshaft position that is related to the first engine cylinder to be fired This pulse is developed once for a full revolution of the engine crankshaft, and when it occurs, an ignition coil to be energized is selected or identified. This, and other similar known distributorless ignition systems are not what can be termed a "fast start" or "fast synchronization" system because the synchronizing signal pulse is developed only once per revolution of the device that is driven by the crankshaft so that a full revolution of the device may be required before a coil can be selected.

It is an object of this invention to provide a crankshaft position detecting apparatus that can provide a coil selection signal within a maximum of about 135 degrees of crankshaft rotation to thereby allow fast starting of the engine. In carrying this object forward, a single timing wheel is provided that is driven by the engine crankshaft. The outer periphery of the timing wheel is provided with a plurality of circumferentially spaced slots. Two angularly spaced sensors are located adjacent the slots. As the crankshaft rotates, voltage pulses are developed in the sensors as a slot passes a sensor. Two identical phase displaced pulse trains are developed, one by each sensor. The angular spacing of the sensors, and the pattern of the slots on the wheel are such that a varying number of pulses of one pulse train occur between consecutively occurring pulses of the other pulse train. This information is indicative of absolute crankshaft position.

Another object of the invention is to provide a crankshaft position detecting apparatus of the type described where the single timing wheel has a plurality of equally spaced slots and a plurality of other slots. The signals developed by the equally spaced slots can be used to determine engine speed. By way of example, the wheel may have twenty-four equally spaced slots which will then provide a signal that has twenty-four equally spaced voltage pulse transitions for each revolution of the crankshaft or in other words, a 24X signal.

A further object of this invention is to provide a crankshaft position detecting apparatus of the type described where the single timing wheel is attached to the engine crankshaft and is located inside of the engine.

Figure 1:
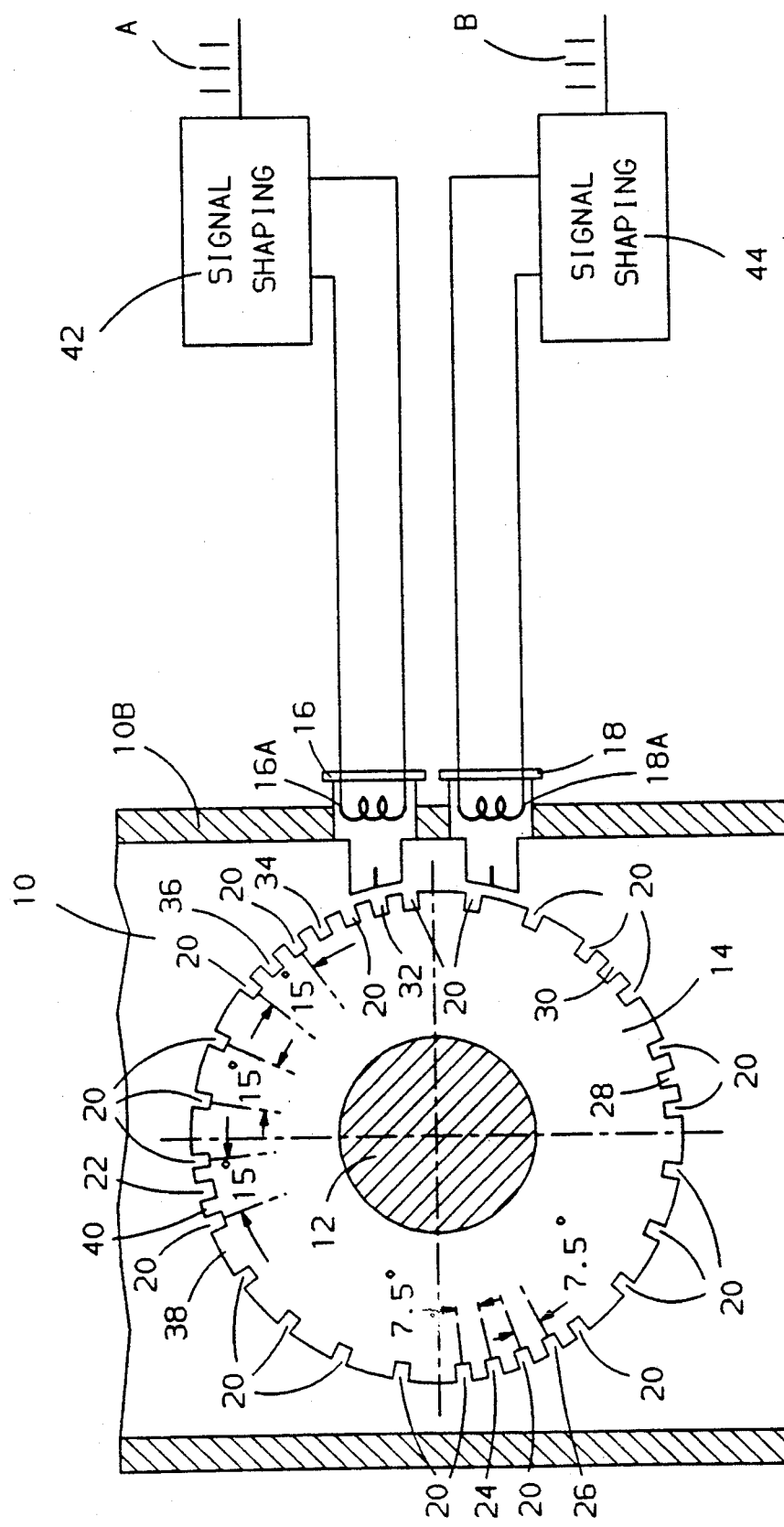
FIG. 1 illustrates a timing wheel and sensors associated therewith made in accordance with this invention.

Referring now to the drawings and more particularly to FIG. 1, the reference numeral 10 designates an eight cylinder internal combustion engine that has a crankshaft 12. Crankshaft 12 carries and drives a circular timing wheel 14 located inside the engine.

A block wall portion 10B of engine 10 carries two variable reluctance sensors 16 and 18 that are mounted in openings formed in block portion 10B. The inner faces of the sensors 16 and 18 are located adjacent the outer periphery of wheel 14. The sensors 16 and 18 each have a pick-up coil 16A and 18A and a permanent magnet (not illustrated). As will be described in more detail hereinafter, voltage pulses are induced in the pick-up coils when wheel 14 rotates. The sensors are arranged such that they are spaced by 27 angular degrees.

The wheel 14 has twenty-four equally angularly spaced slots which are each designated as 20. The centers of these slots are all angularly spaced by 15 degrees. Some of the slots 20 have been labelled to show this angular relationship. The wheel 14 has eight additional slots designated respectively as 22, 24, 26, 28, 30, 32, 34 and 36. The angular spacing between the center of one of the slots 20 and the center of the adjacent slot 24 is 7.5 degrees as is illustrated in FIG. 1. The same is true for the spacing of one of the slots 20 and adjacent slot 26. This same 7.5 degree spacing pattern holds true for the other slots 22 and 28-36, as can be seen from an inspection of FIG. 1.

The slots 20 and slots 22-36 are all 3.75 degrees wide. The solid portions between a pair of slots are of different angular dimensions. Thus, the solid portions, like portion 38, are all 11.25 degrees wide. The solid portions like portion 40 are all 3.75 degrees wide.

The wheel 14 has an outside diameter of about 176 mm. and an axial thickness of about 10 mm.

In FIG. 1, pick-up coil 16A of sensor 16 is shown connected to a signal shaping circuit 42 and pick-up coil 18A of sensor 18 is shown connected to a signal shaping circuit 44. The voltages induced in the pick-up coils are alternating voltages and the shaping circuits converts these voltages to pulses. The output of circuit 42 is a train of pulses designated as A and the output of 44 is a train of pulses designated as B. These pulses are developed by detecting the negative going voltage zero crossings from sensors 16 and 18 which occur at the centers of the slots; that is, a pulse is developed as the center of a slot aligns itself with the center of a sensor. The pulse trains A and B that are developed as wheel 14 rotates are shown in detail in FIG. 2 which will now be described.

Figure 2:
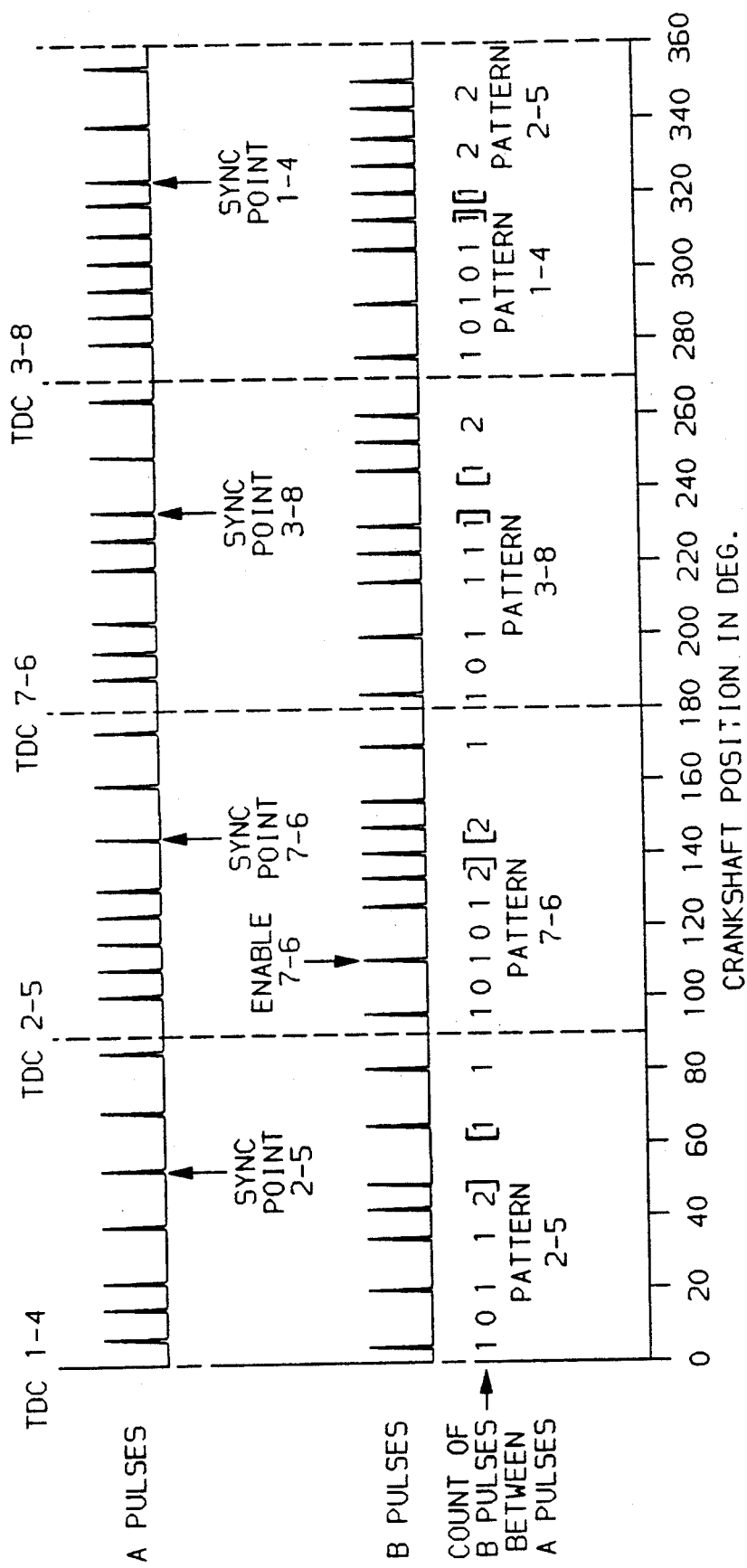
FIG. 2 illustrates sensor signals and pulse count values for the pulses developed by the apparatus shown in FIG. 1 as a function of the angular position of the engine crankshaft.

Referring now to FIG. 2, pulse trains A and B are shown plotted against the angular position of timing wheel 14 in degrees for 360 degrees of rotation of crankshaft 12 and wheel 14. Also shown in FIG. 2 is a count of B pulses that occur between successive A pulses. FIG. 2 has further been labelled to identify the top dead center (TDC) angular positions of a plurality of cylinder pairs. The first number given of a cylinder pair is the firing cylinder; that is, for example, TDC 1-4 indicates that cylinder #1 is the firing cylinder. FIG. 2 has also been labelled SYNC POINT 2-5, SYNC POINT 7-6, SYNC POINT 3-8 AND SYNC POINT 1-4. These sync points refer to angular positions of the crankshaft that are decoded and which represent synchronizing positions that are related to certain cylinder pairs.

Starting at the 0 degree point in FIG. 2, it can be seen that the first number of B pulses that occurs between two A pulses is one. The next four B pulse counts between A pulses is, respectively, zero, one, and one and two. In FIG. 2, brackets have been applied to patterns of pulse counts which have been identified respectively as Pattern 2-5, Pattern 7-6, Pattern 3-8 and Pattern 1-4. The numerals 2-5, 7-6, 3-8 and 1-4 represent cylinder pairs in the eight cylinder engine where the firing order is 1-2-7-3-4-5-6-8. How these patterns are utilized in a distributorless ignition system is described in more detail hereinafter.

The four patterns each have a unique distribution of consecutively occurring pulse counts. Thus, the patterns of consecutively occurring pulse counts of the B pulses between A pulses is as follows:

| Pattern 2-5 | 1 2 2 1 [0 1 1 2] |
| Pattern 7-6 | 1 1 1 0 1 [0 1 2] |
| Pattern 3-8 | 2 1 1 [0 1 1 1 1] |
| Pattern 1-4 | 1 2 1 [0 1 0 1 1] |

It can be seen that the four patterns that have just been described are all different so that they can be decoded to respectively identify a particular cylinder pair of the engine.

There are also four distinct patterns of pulse counts that each began with a zero count, that can be decoded to signify crankshaft position.. These are, from left to right in FIG. 2, 0112, 012, 01111 and 1011. These pulse patterns are also shown in the above table where they have been bracketed. This zero count signal can be used as a trigger signal to start the process of recognizing subsequent pulse count patterns to thereby recognize crankshaft positions.

Figure 3:
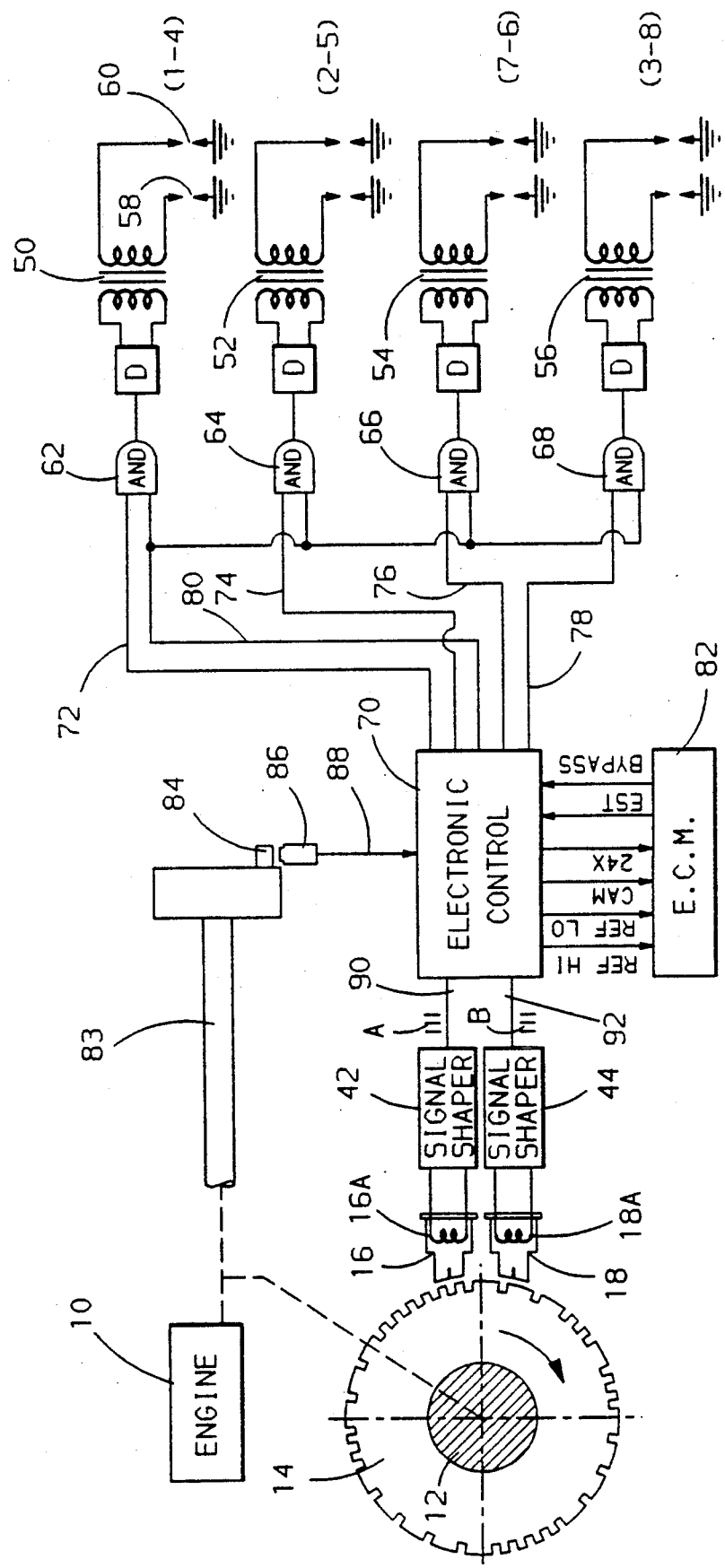
FIG. 3 illustrates a distributorless ignition system that is controlled by the crankshaft position detecting apparatus of this invention.

Referring now to FIG. 3, a distributorless ignition system for an eight cylinder engine is illustrated. The cylinder firing order for this engine is 1-2-7-3-4-5-6-8. This system comprises four ignition coils 50, 52, 54 and 56. The secondary winding of coil 50 is connected to two spark plugs 58 and 60, which are associated respectively with cylinders 1 and 4. Consequently, when a spark plug firing voltage is developed in the secondary winding of coil 50, the spark plugs associated with cylinders 1 and 4 are fired. In a similar fashion, coils 52, 54 and 56 are shown connected to spark plugs that respectively fire cylinders 2 and 5, 7 and 6, and 3 and 8. The primary windings of each ignition coil 50, 52, 54 and 56 are each shown connected to a respective primary winding coil driver D which include transistors for connecting and disconnecting a primary winding to and from the vehicle direct voltage power supply system.

The coil drivers D are respectively connected to AND gates 62, 64, 66 and 68 which control the turn-on and turn-off of the coil drivers. One input of each AND gate is connected to an electronic control 70 by lines 72, 74, 76 and 78. These lines are cylinder bank selector lines and signals on these lines enable respective AND gates. The signals on lines 72-78 are developed in sequential order so that only one of the AND gates is enabled at a time.

The other inputs of AND gates 62-68 are all connected to control 70 by a line 80. A signal is developed on line 80 which goes high and low. This signal causes the primary winding of a given coil to be energized and subsequently deenergized by turning a driver on and off. The signal on line 80 determines the dwell time of a given coil and also the spark timing; that is, when a primary winding is deenergized, the associated spark plugs are fired. The signal on line 80 has a start of dwell transitions (SOD) which causes a primary winding to be energized and an end of dwell transition (EOD) which causes a primary winding to be disconnected from the vehicle voltage source and a consequent firing of two spark plugs.

The electronic control 70 includes digital counters and digital logic networks for processing input signals and developing output signals on lines 72-80. The control 70 is connected to an electronic control module (ECM) 82 by six lines which have been labelled in FIG. 3. This will be described in more detail hereinafter.

In FIG. 3, the engine 10 is shown driving a camshaft 83, as well as crankshaft 12 and wheel 14. The camshaft 83 is driven at one-half crankshaft speed. The camshaft 83 has single protrusion 84 which passes by a variable reluctance camshaft position sensor 86. A single voltage pulse is developed by sensor 86 for each revolution of the camshaft. The voltage pulse occurs about 16 degrees before top dead center of cylinder #2 when it is in its compression stroke. The signal developed by camshaft sensor 86 is applied to control 70 by line 88.

The A pulses (pulse train A) and B pulses (pulse train B) shown in FIG. 2 are applied to electronic control 70 by lines 90 and 92.

The control 70 includes a decoder section which responds to pulse trains A and B. This decoder, when the engine is first started, enables or supplies a signal to one of the four bank selector lines 72-78 dependent upon the position of the crankshaft wheel. It does this by recognizing the pulse count pattern that represents a certain crankshaft position. The sync points shown in FIG. 2 correspond to decoded crankshaft positions for a given cylinder pair. By way of example, if sync point 2-5 occurs first, AND gate 64 is enabled at about 37 degrees before top dead center of cylinder pair 2-5, that is, 37 degrees before (TDC 2-5) as shown in FIG. 2. The maximum angular movement of wheel 14 before a crankshaft position is recognized is about 135 degrees.

In regard to the sequential enabling of AND gates 62-68, let it be assumed that during engine starting, the first sync point that was decoded is SYNC POINT 2-5. The AND gate 64 is now enabled at about thirty-seven degrees BTDC of cylinder pair 2-5. A counter in control 70 now counts the B pulses that occur after SYNC POINT 2-5 and when four B pulses have been counted, AND gate 66 is enabled to enable cylinder pair 7-6. The fourth B pulse that is counted corresponds to the second pulse that occurs after TDC 2-5. This pulse has been labelled as "ENABLE 7-6". Following this, B pulses are counted that correspond to 90 degrees of crankshaft rotation so that respective AND gates are sequentially enabled at each 90 degrees of rotation of the crankshaft. Thus, AND gate 68 is enabled, to enable cylinder pair 3-8, after 90 degrees of crankshaft rotation following the enabling of AND gate 66. The AND gate 62 is enabled after 90 degrees of crankshaft rotation following the enabling of AND gate 68. This sequence continues once the engine has been started.

The ECM 82 takes the form of a programmed microprocessor which is capable of providing spark timing information for controlling spark timing advance. It receives information that may include, for example, engine temperature and engine manifold pressure. The ECM receives 4 voltage pulses per revolution of wheel 14. These reference pulses are applied to the ECM by the REF HI line. These reference pulses are defined by a square wave that is high for 30 crankshaft degrees and low for 60 crankshaft degrees. A high-to-low transition occurs every 90 crankshaft degrees and these transitions occur at 70 degrees BTDC of every cylinder pair. The reference pulses are developed by counting pulses of pulse train B in control 70. The ECM uses this REF HI signal to compute engine speed. From this speed information and other engine operating parameters, the ECM 82 computes a spark timing advance value relative to the cylinder top dead center (TDC).

The ECM further receives 24 voltage pulses per revolution of wheel 14. This is accomplished by stripping the eight pulses of pulse train B that correspond to slots 22–36 from the pulse train. This is accomplished by an electronic stripping circuit in control 70. This 24X signal (24 voltage pulses per revolution) is applied to ECM 82 via the line labelled 24X.

After the ECM has computed a spark timing advance, it determines which one of the 24X pulses will immediately preceed the desired spark advance angle. Then, using the REF HI signal as a starting point, the ECM counts 24X pulses to the proper 24X pulse. Then the ECM delays for a time period depending on the computed spark timing advance value and the engine speed. After the delay, a signal is applied to the EST line to fire a pair of spark plugs.

After the ECM has computed a spark timing advance, it applies a signal to the EST line at the time that a pair of spark plugs are to be fired. Control 70 now applies an EOD signal to line 80 which causes primary winding current in one of the primary windings to be interrupted.

The BYPASS line connecting ECM 82 and control 70 applies a signal to control 70 which determines whether or not the spark advance will be controlled from the output of ECM 82 or by factors internally developed by control 70. During engine starting, control 70 causes the spark advance to be about 10 degrees BTDC. This is accomplished by transitions of the reference pulse train. When the engine starts, and below about 400 RPM, control 70 develops a bypass advance that is a function only of engine speed. Bypass control is also used in the event of a failure of the ECM 82 or a failure of interconnects between 70 and 82.

The cam pulse developed by sensor is applied to ECM 82 via control 70 by the line labelled CAM. The cam pulse applied to ECM 82 is for fuel injection synchronization.

The cam pulse serves another useful function. In the event that either sensor 16 or sensor 18 fails so that either pulse train A or pulse train B no longer exists, the system can still identify the proper cylinder pair to fire. As described, the cam signal pulse occurs at a fixed relationship to cylinder number 2. Knowing this information, the pulses of the pulse train (A or B) that still exists can be counted by control 70 from the occurrence of the cam pulse to develop a proper bank selection signal for enabling one of the AND gates 62–68. In this mode of operation, the fast synchronization feature of this invention is lost since two full crankshaft revolutions may now be required to achieve synchronization.

In the description of this invention, the wheel 14 has been described as having a plurality of slots located along its outer periphery in a certain pattern. Instead of using slots, the wheel could be provided with radially projecting teeth that would have the same width as the slots and which would be disposed in the same pattern as the slots. In some of the appended claims, the term "mark" has been used. The word is intended to be interpreted to cover slots or radially projecting teeth.

The embodiments of the invention in which an exclusive property or privilege is claimed are defined as follows:

1. A crankshaft position detecting apparatus for detecting the angular position of the crankshaft of an internal combustion engine comprising, a single wheel driven by said crankshaft, said wheel having a plurality of first circumferentially spaced marks, said marks being equally spaced along the entire circumference of a circle, said wheel having a plurality of second marks, first and second sensors located adjacent said marks that are spaced from each other by a predetermined number of angular degrees, each sensor developing a voltage pulse when a given mark passes a sensor to thereby develop first and second identical pulse trains as said wheel rotates, the consecutively occurring pulses of each pulse train being a function of the number of and spacing of said first and second marks, the angular spacing of said sensors and the number and spacing of said first and second marks being such that predetermined different numbers of pulses of said first pulse train occur between consecutively occurring pulses of said second pulse train, the consecutive occurrence of said different numbers of pulses having a predetermined pattern which represents crankshaft angular position.

2. The apparatus according to claim 1 where said different numbers of pulses of said first pulse train that occur between consecutively occurring pulses of said second pulse train have values that are either zero, one or two.

3. The apparatus according to claim 1 where the wheel has twenty-four equally circumferentially spaced marks.

4. The apparatus according to claim 1 where the wheel has twenty-four marks that are equally spaced by 15 degrees and eight other marks that are spaced from each other by 7.5 degrees.

5. The apparatus according to claim 1 where the wheel is attached to the crankshaft of the engine and is located inside the engine.

6. The apparatus according to claim 1 where said marks are provided by slots formed in said wheel.

7. A crankshaft position detecting apparatus for detecting the angular position of the crankshaft of an internal combustion engine comprising, a single wheel driven by said crankshaft, said wheel having a plurality of first circumferentially spaced slots, said first slots being all equally spaced and disposed about the entire outer periphery of said wheel, said wheel having a plurality of second slots located at its outer periphery, first and second sensors located adjacent said slots that are spaced from each other by a predetermined number of angular degrees, each sensor developing a voltage pulse when a given slot passes a sensor to thereby develop first and second identical pulse trains as said wheel rotates, the consecutively occurring pulses of each pulse train being a function of the number of and spacing of said first and second slots, the angular spacing of said sensors and the number and spacing of said first and second slots being such that predetermined different numbers of pulses of said first pulse train occur between consecutively occurring pulses of said second pulse train, the consecutive occurrence of said different numbers of pulses having a predetermined pattern which represents crankshaft angular position.

8. The apparatus according to claim 7 where said different numbers of pulses of said first pulse train that occur between consecutively occurring pulses of said second pulse train have values that are either zero, one or two.

9. The apparatus according to claim 7 where the wheel has twenty-four equally circumferentially spaced slots.

10. The apparatus according to claim 7 where the wheel has twenty-four slots that are equally spaced by 15 degrees and eight other slots that are spaced from each other by 7.5 degrees.

11. The apparatus according to claim 7 where the wheel is attached to the crankshaft of the engine and is located inside the engine.

* * * * *